US006285815B1

(12) United States Patent
Daoud

(10) Patent No.: US 6,285,815 B1
(45) Date of Patent: Sep. 4, 2001

(54) HIGH DENSITY FUSION SPLICE HOLDER

(75) Inventor: Bassel Hage Daoud, Parsippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/391,020

(22) Filed: Sep. 7, 1999

(51) Int. Cl.⁷ .................................................. G02B 6/00
(52) U.S. Cl. ................................ 385/137; 385/135
(58) Field of Search .................................. 385/135, 136, 385/137; 439/942, 449; 174/92

(56) References Cited

U.S. PATENT DOCUMENTS

| 5,222,184 | * | 6/1993 | Foss ........................................ 385/135 |
| 5,515,472 | * | 5/1996 | Mullaney et al. ....................... 385/135 |
| 5,530,786 | * | 6/1996 | Radliff et al. .......................... 385/136 |
| 5,566,268 | * | 10/1996 | Radliff et al. .......................... 385/137 |
| 5,566,269 | * | 10/1996 | Eberle, Jr. et al. .................... 385/137 |
| 5,805,758 | * | 9/1998 | Kim ........................................ 385/137 |

* cited by examiner

*Primary Examiner*—Cassandra Spyrou
*Assistant Examiner*—Euncha Cherry
(74) *Attorney, Agent, or Firm*—Stroock & Stroock & Lavan LLP

(57) ABSTRACT

A splice holder is provided for accommodating a plurality of splices of fiber optic cables. The holder is formed with a base from which extend a plurality of deflectable arms and obstruction walls. The arms are arranged in adjacent offset fashion with adjacent arms having a common deflection space in which deflection of the arms occur. Additionally, the obstruction walls are configured to simultaneously engage two different splices. The arrangement of the arms and the obstruction walls minimizes the required area of the splice holder.

4 Claims, 3 Drawing Sheets

# HIGH DENSITY FUSION SPLICE HOLDER

FIELD OF THE INVENTION

This invention relates to the field of fiber optic cable management and, more particularly, to fiber optic cable splice holders.

BACKGROUND OF INVENTION

It is envisioned that one day, all telephone wires will be replaced by fiber optic cables. To be able to properly identify a particular fiber optic cable in a central office, or other station where there may be hundreds to thousands of such cables, fiber optic cable management is necessary, wherein bundles of cables/single cables are passed through holders, guides, etc., to and from terminal points. In this manner, a technician may readily identify a particular cable needing servicing or replacement by its path.

In the prior art, various devices and techniques have been developed to manage standard copper telephone wiring. However, fiber optic cables are physically much weaker and more brittle than copper wiring, and prior art copper wiring management devices and techniques are not entirely transferable to fiber optic cable management. Additionally, splices of fiber optic cables are particularly susceptible to failure and require special consideration.

There are basically two types of fiber optic cable splices: fusion splices and array ribbon splices. A fusion splice is used to join one fiber optic cable to another, wherein the two cables are fused together. An array ribbon is a flat ribbon formed by a plurality of joined fiber optic cables (sheaths disposed about the cables are joined, not the cables themselves). In an array ribbon splice, two array ribbons are mass fused with cables of both ribbons being individually joined. To prevent damage to, and possible failure of, the fused joint, a reinforcing bar is typically provided. Additionally, the reinforcing bar and the fused joint are invaginated within a protective sheath.

As can be readily appreciated, fiber optic cable systems require great numbers of splices. To facilitate management and organization of the cables within such systems, holders have been used in the prior art to hold the splices. (As used herein, the term "splice" refers to the assembly of a fused joint of fiber optic cables, and, generally, although not necessarily, a reinforcing bar and a protective sheath.) With space (in enclosures and other volumes) being at a premium, it is continuously desirable to reduce the size of a splice holder, yet increase the number of splices that it can accommodate. In other words, it is desirable to increase the density of the splice holder —i.e. obtain a higher ratio of the number of splices accommodated by a splice holder relative to the unit area of the splice holder.

SUMMARY OF THE INVENTION

To overcome shortcomings in the prior art, the present invention comprises a splice holder formed with a plurality of deflectable fiber optic cable arms extending from a base of the holder. The arms are arranged in pairs, with each pair positioned to engage a single splice. Additionally, each pair of arms is matched with facing splice engaging surfaces, which cooperate with the associated arms to engage and hold a splice.

To maximize the density of splices the holder can accommodate, adjoining arms are staggered in adjacent offset relation to face opposing directions, thereby being arranged to share a deflection space. The longitudinal boundaries of the deflection space are defined by the arms. Specifically, each of the arms is formed with an inner edge that faces the matched splice engaging surface. An imaginary plane is defined by each of the inner edges, and the spacing between the imaginary planes of adjoining arms defines the width of the deflection space. Stated differently, in undeflected states, the inner edges of adjoining arms define the width of the deflection space.

Each of the arms is deflectable rearwardly to engage and latch onto a fiber optic cable splice, wherein, the rearward deflection of the arms causes the respective arm to travel the full extent over a deflection distance. The deflection space has a width ($D_S$) that is less than the sum of the deflection distance swept by one of the arms ($D_1$) in a pair of adjoining arms and the deflection distance swept by the other arm ($D_2$) in the pair. Stated algebraically, $D_S < D_1 + D_2$.

With the subject invention, the simultaneous engagement of different splices by adjoining arms results in simultaneous deflection of the arms into a single deflection space. The use of the single deflection space to accommodate the deflection of adjoining arms allows for a smaller holder area to be utilized than if adjoining arms had not been staggered and arranged in adjacent offset relation.

Furthermore, some of the splice engaging surfaces are formed on obstruction walls. The obstruction walls are advantageously disposed between opposing arms, thereby reducing the required area of the holder, since each of the obstruction walls defines two splice engaging surfaces. Consequently, a separate obstruction wall is not required for each splice that is to be held by the holder of the subject invention.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

BRIEF DESCRIPTION OF THE DRAWINGS

In the drawing figures, which are not to scale, and which are merely illustrative, and wherein like reference numerals depict like elements throughout the several views.

DETAILED DESCRIPTION OF THE PREFERRED EMBODIMENTS

Figure 1:
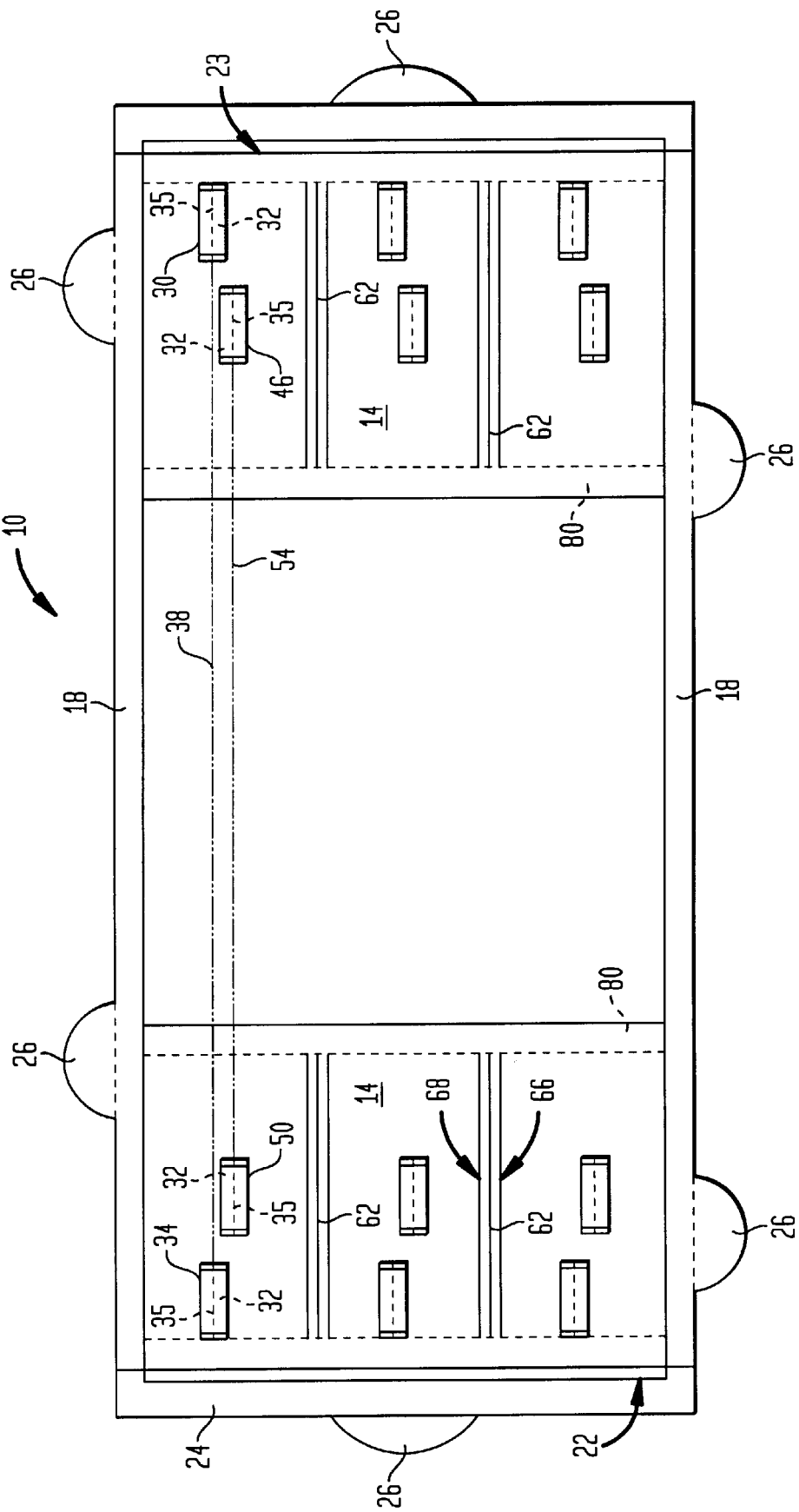
FIG. 1 is a top plan view of the splice holder of the subject invention.
Figure 2:
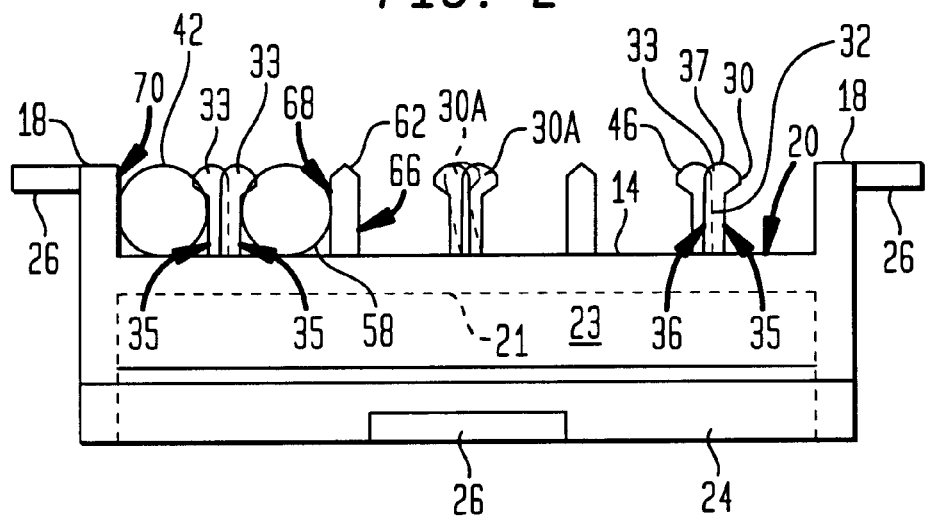
FIG. 2 is an end elevational view of the splice holder of the subject invention.
Figure 3:
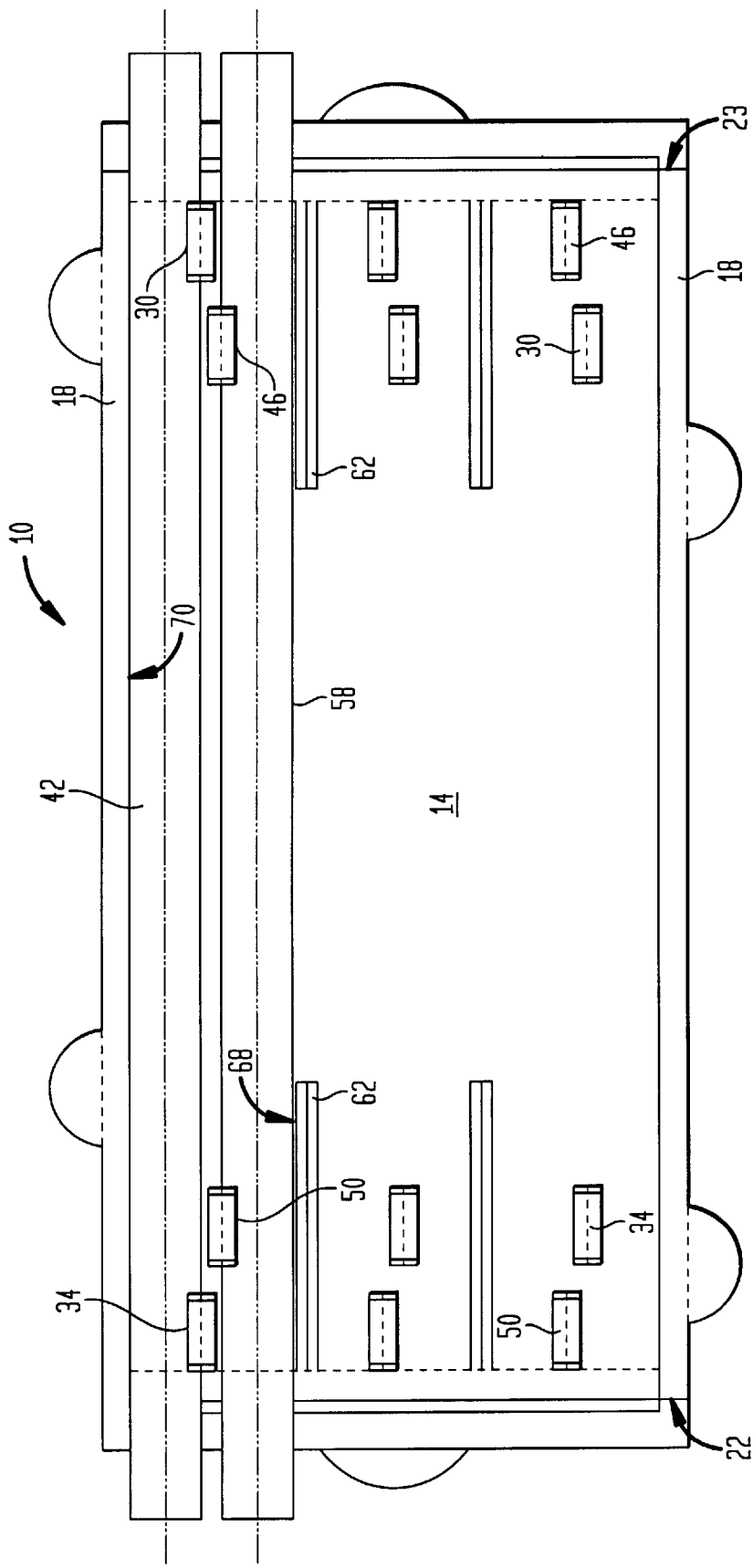
FIG. 3 is a top plan view of an alternative embodiment of the splice holder of the subject invention with two splices of fiber optic cables being engaged and held thereby.

Referring initially to FIGS. 1, 2 and 3, a splice holder is shown and designated generally with the reference numeral 10. The splice holder 10 is formed with a base 14 that, as shown in FIG. 1, can be discontinuously formed with spaced-apart, coplanar portions, or alternatively, as a single, continuous planar base extending the full length of the splice holder 10, as shown in FIG. 3.

The splice tray 10 includes side walls 18 that are connected to longitudinal edges of the base 14. As shown in FIG. 2, the side walls 18 extend both above an upper surface 20 of the base 14, and below a lower surface 21 of the base 14. The splice holder 10 is also formed with end walls 22, 23 that extend from outer ends of the base 14 and downwardly between lower portions of the side walls 18 to partially bound the lower surface 21 of the base 14. Flanges 24 are also provided which extend outwardly from bottom portions of the end walls 22, 23. As shown in FIG. 1, the flanges 24 define outwardly extending shoulders that may be used to mount the splice holder 10 into an opening in a tray or other enclosure. Additionally, tabs 26 can be formed on the side walls 18 and/or the flanges 24 to also facilitate mounting of the splice holder 10 into an opening in a desired location, or the splice holder 10 can be secured to a mounting surface by any known fastening or securing technique known in the art.

A plurality of arms are provided extending upwardly from the upper surface 20 of the base 14. To explain the principles of the subject invention, the following discussion focuses on certain of the arms. It is to be understood that this discussion is for illustrative purposes, and in no way limits the disclosure herein. The non-referenced arms are formed, configured and work in accordance with the discussed principles.

A first arm 30, a second arm 34, a third arm 46, and a fourth arm 50 are all formed to extend upwardly from the upper surface 20 of the base 14. Referring to FIG. 2 and to the first arm 30 by example, each of the arms is formed with a stem 32, having inner and outer surfaces 35, 36, and a detent 33 depending from the stem 32. The detent 33 is formed to extend beyond the inner surface 35 to define a latching element for engaging and latching onto a splice, as described below.

Also, each of the arms 30, 34, 46, 50 is resilient and formed to be deflectable. Referring to FIG. 2 by example to show the delectability of the arms, arm 30A is shown in solid lines in an undeflected natural state, and in dashed lines in a fully deflected state. For the arm 30A to achieve a deflected state, the arm 30A must sweep a deflection distance. It is also noted that the resiliency of the arms biases the arms to their respective natural states. Preferably, the detents 33 are provided with a curved or ramped camming surface 37 to facilitate deflection of the respective arm by efficiently translating a downward force applied thereto by a splice to a lateral deflection force.

The first and second arms 30 and 34 are located with the respective inner surfaces 35 lying on a single axis, shown in FIG. 1 as reference axis 38. The uniaxial arrangement of the first and second arms 30 and 34 enables the arms to engage and latch onto the same splice of fiber optic cables. Similarly, the third arm 46 and the fourth arm 50 have their respective inner surfaces uniaxially aligned to lie along an axis represented by reference axis 54. The respective pairs of arms 30, 34 and 46, 50 are located to engage and hold splices with the longitudinal axes thereof being parallel to the corresponding reference axis 38 and 54, respectively. Preferably, the reference axes 38 and 54 are also generally parallel.

Figure 2A:
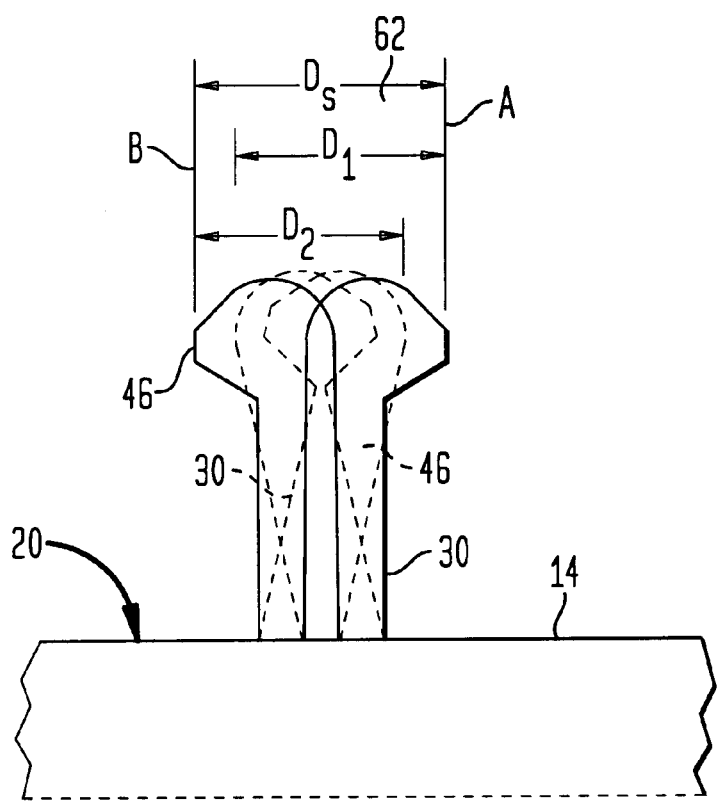
FIG. 2A is an exploded view taken from FIG. 2 of adjoining arms.

In arranging the arms 30, 34, 46, 50 on the base 14, the arms are staggered in an adjacent offset pattern such that adjacent arms 30, 46 and 34 50 are not uniaxially aligned along an axis parallel to either, or both, of the reference axes 38 and 54. In this manner, the arms are arranged to share a common deflection space 62. The width ($D_S$) of the deflection space 62 is a function of the width of the arms themselves and the amount of distance the arms travel under deflection. In particular, reference is made to FIG. 2A, where the full deflection of the arms 30, 46 is shown in dashed lines. The arm 30 defines a deflection distance ($D_1$) from an imaginary plane A to its rearmost portion in a fully deflected state. Plane A is defined to pass through the front edge of the detent 33 and be generally perpendicular to the plane of FIG. 2A. Likewise, the arm 46 defines a deflection distance ($D_2$) from an imaginary plane B to its rearmost portion in a fully deflected state. Plane B is defined to pass through the front edge of the detent 33 and be generally perpendicular to the plane of FIG. 2A. It is noted that the deflection of adjacent offset arms, such as arms 30 and 46, occur in opposing directions. For example, in FIG. 2A, the deflection of arm 30 is leftward, whereas, deflection of arm 46 is rightward. In accordance with the invention, and to minimize the area of the splice holder 10, the width ($D_S$), which is defined between the planes A and B is formed to be less than the sum of the two deflection distances ($D_1$, $D_2$). It is preferred that planes A and B be perpendicular to the upper surface 20 of the base 14, and both be parallel to the reference axes 38 and 54 (and, thus, parallel to the longitudinal axes of engaged splices).

Obstruction walls 64 are provided, which extend upwardly from the upper surface 20 of the base 14, and which are formed with opposing splice engaging surfaces 66, 68. Preferably, the obstruction walls 62 are disposed to have one of the arms face the splice engaging surface 66 and another arm face the splice engaging surface 68. For example, with reference to FIG. 2, the arm 30A faces the splice engaging surface 66, whereas, the arm 46 faces the splice engaging surface 68. By "sharing" the obstruction walls 62 with two different arms, a ratio of one obstruction wall to each engaged splice is avoided and the width of the splice holder 10 can be reduced. The side walls 18 also define splice engaging surfaces 70.

Locations of the arms can be varied without departing from the spirit of the invention. For example, the arms 30, 34, 46, 50 can be offset to have arm 50 be located intermediate arm 34 and the end wall 22. Likewise, arm 46 can be located intermediate arm 30 and the end wall 23. As a variation, as shown in FIG. 3, arms 30 and 34, respectively, can be located intermediate corresponding arms 46 and 50 and the adjacent end walls 22 and 23.

In use, the splice holder 10 is used to accommodate a plurality of splices of fiber optic cables, such as splices 42 and 58 shown in FIG. 3, which each extends along a longitudinal axis shown in dash-dot-dash lines. By example, the splice 42 is mounted onto the splice holder 10 by pressing the splice 42 downwardly against camming surfaces 37 of the detents 33 of the arms 30 and 34. The applied downward force causes deflection of the arms 30, 34 and allows the splice 42 to be nested between the inner surfaces 35 of the arms 30, 34 and the splice engaging surface 70 of the side wall 18. With the splice 42 being nested, the deflecting force is removed from the arms 30, 34. The resilience of the arms 30, 34 urges the arms to return to their natural, undeflected states, wherein, as shown in FIG. 2, the detents 33 are formed to latch onto the splice 42. It is preferred that the arms 30, 34 be configured and located relative to an engaged splice to not allow for full return to their natural states, so that the resilience of the arms 30, 34 generates pressure on the side of the splice 42 and, in effect, clamps the splice 42 with the splice engaging surface 70. The combination of the generated pressure, the splice engaging surface 70, and the latching of the detent 33 provides a holding force for maintaining the splice 42 within the splice holder 10.

With the splice 42 being mounted, the second splice 58 can be mounted in similar fashion to the splice holder 10.

Here, the arms 46 and 50 are utilized, as well as, the splice engaging surface 68. Advantageously, the arms 46 and 50 can be deflected to accept the splice 58, without hindrance from the mounted splice 42 or the arms 30 and 34.

As an additional feature, reinforcing ribs 80 can be provided on the lower surface 21 of the base 14, to impart rigidity thereto. This is especially beneficial where the base 14 is discontinuous and edges of the base 14 can be subjected to deformation resulting from excessively high insertion forces in mounting splices to the splice holder 10.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A splice holder for accommodating a plurality of splices of fiber optic cables, said holder comprising:
    a base having an upper surface;
    a deflectable first arm extending upwardly from said upper surface of said base, said first arm being deflectable in a first direction for receiving a first fiber optic splice having a first longitudinal axis, a first plane passing through a front edge of said first arm in an undeflected state, said first plane being generally perpendicular to said upper surface of said base and parallel to said first longitudinal axis, wherein, upon deflection, said first arm travels a first distance from said first plane to a rearmost portion of said first arm in a fully deflected state; and,
    a deflectable second arm extending upwardly from said upper surface of said base, said second arm being deflectable in a second direction, opposite said first direction, for receiving a second fiber optic splice having a second longitudinal axis, a second plane passing through a front edge of said second arm in an undeflected state, said second plane being generally perpendicular to said upper surface of said base and parallel to said second longitudinal axis, wherein, upon deflection, said second arm travels a second distance from said second plane to a rearmost portion of said second arm in a fully deflected state, and wherein, a third distance is defined between said first and second planes, said third distance being less than the sum of said first and second distances.

2. A splice holder as in claim 1, wherein said base is formed with longitudinally spaced-apart first and second ends, and wherein said first arm is located a fourth distance from said first end of said base, said second arm is located a fifth distance from said first end of said base, said fourth distance being greater than said fifth distance.

3. A splice holder for accommodating a plurality of splices of fiber optic cables, said splice holder comprising:
    a base having an upper surface;
    a deflectable first arm extending upwardly from said upper surface of said base, said first arm being formed to engage and latch onto a first splice of fiber optic cables disposed to extend longitudinally along a first axis; and
    a deflectable second arm extending upwardly from said upper surface of said base, said second arm being formed to engage and latch onto a second splice of fiber optic cables disposed to extend longitudinally along a second axis; and
    wherein, said first axis and said second axis are generally parallel, and wherein said first arm and said second arm are positioned to at least partially overlap as viewed in a direction generally parallel to said first and second axes.

4. A splice holder as in claim 3, wherein said base is formed with longitudinally spaced-apart first and second ends, and wherein said first arm is located a first distance from said first end of said base, said second arm is located a second distance from said first end of said base, said first distance being greater than said second distance.

* * * * *